(12) United States Patent
Brasch et al.

(10) Patent No.: US 12,252,411 B2
(45) Date of Patent: Mar. 18, 2025

(54) STABLE SHAPED ALUMINA AND METHOD FOR PRODUCING SAME

(71) Applicant: Sasol Germany GmbH, Hamburg (DE)

(72) Inventors: Andrea Brasch, Meldorf (DE); Angela Siegel, Hannover (DE); Yanick Holzmann, Marne (DE); Stefan Howe, Sankt Michaelisdonn (DE)

( * ) Notice: Subject to any disclaimer, the term of this patent is extended or adjusted under 35 U.S.C. 154(b) by 0 days.

(21) Appl. No.: 17/925,502

(22) PCT Filed: May 26, 2021

(86) PCT No.: PCT/EP2021/064116
§ 371 (c)(1),
(2) Date: Nov. 15, 2022

(87) PCT Pub. No.: WO2021/239846
PCT Pub. Date: Dec. 2, 2021

(65) Prior Publication Data
US 2023/0183085 A1    Jun. 15, 2023

(30) Foreign Application Priority Data

May 26, 2020    (EP) .................................... 20176653

(51) Int. Cl.
*C01F 7/026*    (2022.01)

(52) U.S. Cl.
CPC .......... *C01F 7/026* (2013.01); *C01P 2002/52* (2013.01); *C01P 2002/60* (2013.01); *C01P 2002/72* (2013.01); *C01P 2002/88* (2013.01); *C01P 2004/32* (2013.01); *C01P 2004/60* (2013.01); *C01P 2006/12* (2013.01); *C01P 2006/14* (2013.01); *C01P 2006/16* (2013.01); *C01P 2006/33* (2013.01); *C01P 2006/80* (2013.01); *C01P 2006/90* (2013.01)

(58) Field of Classification Search
CPC .................................................. C01F 7/00–788
See application file for complete search history.

(56) References Cited

U.S. PATENT DOCUMENTS

| | | | | |
|---|---|---|---|---|
| 4,242,236 A * | 12/1980 | Blakely | ..................... | B01J 21/12 502/439 |
| 4,318,896 A * | 3/1982 | Schoonover | ............ | C01F 7/021 423/628 |
| 4,542,113 A * | 9/1985 | Meyer | ..................... | C01F 7/025 502/355 |
| 2007/0021292 A1* | 1/2007 | Maki | ....................... | C01F 7/023 501/153 |
| 2011/0160104 A1* | 6/2011 | Wu | ........................... | C09K 8/80 507/269 |

FOREIGN PATENT DOCUMENTS

| WO | 9317968 | 9/1993 |
|---|---|---|
| WO | 2020020960 | 1/2020 |

\* cited by examiner

*Primary Examiner* — Alexandre F Ferre
(74) *Attorney, Agent, or Firm* — Werner IP Law, P.C.

(57) ABSTRACT

The present invention relates to a calcined shaped alumina and to a method of preparing a calcined shaped alumina. The method comprises that the alumina in the alumina suspension is hydrothermally aged to have a specific crystallite size. This in turn produces a highly stable alumina in the form of a calcined shaped alumina particularly at temperatures of 1200° C. and above.

19 Claims, 4 Drawing Sheets

STABLE SHAPED ALUMINA AND METHOD FOR PRODUCING SAME

The present invention relates to a calcined shaped alumina or as synonymously used "calcined shaped alumina carrier" and to a method of preparing a calcined shaped alumina carrier/calcined shaped alumina.

BACKGROUND

Activated aluminas are widely used as carriers for numerous heterogeneous catalysis applications. These include both fixed bed, also called packed bed, on the one hand and moving bed or fluidized bed applications on the other. For fixed bed applications it is important to prepare a catalyst that provides for uniform packing of the bed to avoid channeling and temperature gradients and for fluidized or moving bed applications one key aspect is to prepare a stable and strong catalyst to avoid attrition or break-up of catalyst particles due to impact against the reactor walls or against each other. For some applications it is advantageous for the alumina to be shaped. Particularly in fixed bed catalysis a number of catalyst shapes have been proposed in the prior art to balance the difficulties experienced with respect to catalyst activity and pressure drop across the catalyst bed.

As used in this specification, shaping refers to processes and methods for aggregating particles into larger shapes, preferably having some regularity in shape, and shaped has a corresponding meaning. Following such shaping, it is then necessary to calcine the shapes in order to provide strength and fix the shape. A person skilled in the art of the invention will thus understand that by calcined shaped alumina/calcined shaped alumina carriers is meant for example alumina spheres preferably shaped in a forming column, alumina extrudates, and alumina tablets.

U.S. Pat. No. 4,542,113 provides a process for preparing spheroidal alumina from boehmite alumina. The spheres obtained by the method disclosed are said to have diameters of between 2 and 3 mm, a crush strength up to 200 N/sphere, a pore volume of between 0.45 and 0.75 ml/g and a surface area of between 220 and 250 m$^2$/g.

There is a need for improved shaped catalyst carriers having specific properties and in particular a combination of specific properties.

SUMMARY OF THE INVENTION

According to a first aspect of the invention there is provided a calcined shaped alu-mina/calcined shaped alumina carrier, comprising the following features a) and b):
a) a crush strength between 30 and 70 N, preferably between 40 and 60 N; and
b) a monodispersed pore radius distribution with a median pore radius between 5 and 12 nm, preferably between 7 and 10 nm.

Preferably the calcined shaped alumina further comprises one or more and preferably all of the features c) to f):
c) a total pore volume between 0.4 and 1.2 cm$^3$/g, preferably between 0.7 and 1.0 cm$^3$/g;
d) a BET surface area between 10 and 100 m$^2$/g after calcination at 1200° C. for 3 hours, preferably between 40 and 80 m$^2$/g after calcination at 1200° C. for 3 hours;
e) a content of Na, Fe and Si impurities of the calcined shaped alumina is each below 100 ppm, preferably each below 50 ppm; and
f) an alpha transition temperature above 1200° C., preferably above 1300° C.

Preferably the calcined shaped alumina comprising features a) and b) further comprises at least feature c).

The calcined shaped alumina may be produced according to below method.

According to a further aspect of the invention there is provided a method to prepare a calcined shaped alumina, the method comprising the following steps:
i) preparing an alumina suspension, the alumina suspension comprising alu-mina and at least water;
ii) hydrothermally ageing the alumina suspension until the alumina in the alu-mina suspension has a crystallite size along the (120) axis and the (020) axis each of 60 to 140 Å to form a hydrothermally aged alumina suspension,
iii) optionally drying the hydrothermally aged alumina suspension to obtain an alumina powder;
iv) optionally preparing either an alumina paste from the alumina powder or an alumina dispersion from either the alumina powder or the hydrothermally aged alu-mina suspension;
v) shaping the alumina powder, or the alumina paste, or the alumina dispersion, or the hydrothermally aged alumina suspension, or mixtures thereof to form a shaped alumina;
vi) drying the shaped alumina to form dried shaped alumina; and
vii) calcining the dried shaped alumina to form the calcined shaped alumina.

Step iv) is optional as the alumina powder of step iii) may directly be shaped in step v). Step iii) is optional as the hydrothermally aged alumina suspension of step ii) can directly be used in step iv) or v).

The calcined shaped alumina is a calcined shaped alumina carrier or can be used as carrier for heterogeneous catalysis applications.

DETAILED DESCRIPTION OF THE INVENTION

The calcined shaped alumina may be in the form of spheroids preferably shaped in a forming column, extrudates, tablets or mixtures thereof. The calcined shaped alu-mina is preferably a spheroid, i.e. spheroidal alumina. By spheroid or spheroidal in this invention is meant a spheroid having a sphericity preferably above 0.9.

Forming spheroidal alumina in a forming column relies on the introduction of alu-mina-containing sols, solutions or other mixtures into a liquid as droplets that are then transformed into spheroids. Numerous variations and improvements specifically applicable to shaping spheroidal alumina particles are known to the skilled person and are for example described in U.S. Pat. No. 4,542,113 and the art cited therein. The disclosure of U.S. Pat. No. 4,542,113 is hereby incorporated by reference, in particular regarding the shaping by use of a forming column.

The longest dimension of the calcined shaped alumina is at least 0.5 mm (with regards to the spheres the longest dimension is for example the diameter). When the calcined shaped alumina is in the form of a spheroidal alumina it may comprise the further characteristic of a diameter of between 0.5 mm and 3.0 mm.

The diameter of the spheroidal alumina is determined according to the ASTM D1155 standard.

The calcined shaped alumina comprises according to one embodiment a monodispersed pore radius distribution. By monodispersed pore radius distribution is meant a pore radius distribution obtained by mercury intrusion (DIN 66133) where only one global maximum and no local maxima are identified (i.e. the pore radius distribution is unimodal) for a radius in a range between 1 and 100 nm. This is one of the advantages of the invention as in past situations two maxima were expected. The calcined shaped alumina of the present invention comprises a median pore radius in the range between 5 and 12 nm, preferably between 7 and 10 nm.

The pore radius distribution and in turn the total pore volume is measured using the standard DIN 66133 (Determination of pore volume distribution and specific surface area of solids by mercury intrusion).

It is well known that the thermal transformations of the various phases of alumina when increasing the temperature ultimately lead to alpha-alumina. Usually, the last step in the thermal transformation is the phase transition from the theta to the alpha phase. The transition to the alpha phase is accompanied by a loss of porosity and surface area, and alpha-alumina powders produced by high temperature calcination are usually characterized by a low BET surface area of around 5 $m^2/g$.

The inventive calcined shaped alumina is characterized according to one embodiment by an outstanding thermostability, i.e. where the alumina resists undergoing a phase transition to the alpha phase and remains in the theta phase. Even where a phase transition to the alpha-phase does take place, the inventive calcined alumina is characterized by larger surface areas than expected for typical alpha-alumina. The term "thermostability" employed herein means thermal stability to changes in the surface and/or crystalline phase brought about by external influences induced by temperature changes possible along with other external influences such as water, chemicals, pressure and mechanical stress. For example, thermostability may be characterized by the surface area, determined by BET method using nitrogen according to DIN ISO 9277, which is retained after a sample is calcined in a muffle furnace after 3 h at 1200° C. or after 3 h at 1300° C. (heating rate between 1 K/min. and 10 K/min.).

The calcined shaped alumina may further comprise dopants. The dopants preferably comprise rare earth elements, transition elements (elements of groups 3 to 11 in particular 4 to 11, in particular elements of the groups 4 (old IUPAC numbering IVb) and 5 (old IUPAC numbering Vb) of the Periodic System of the Elements) and Tin and Bismuth. The amount of dopant added is between 0 to 1 wt.-% or above 0 to 1 wt.-%, preferably between 0 to 0.5 wt.-% or above 0 to 0.5 wt.-%, the weight of the dopant being calculated as the element and the wt.-% is relative to the calcined shaped alumina. Preferably, the calcined shaped alumina is doped with organic and inorganic salts of the transition elements, rare-earth elements and elements of the groups 4 (old IUPAC numbering IVb) and 5 (old IUPAC numbering Vb) of the Periodic System of the Elements, more preferably Sn and Bi. Most preferably the calcined shaped alumina is doped with $SnCl_4$ or $Bi(NO_3)_3 \times 5\ H_2O$.

The preferred embodiments of the method according to the invention are further defined as follows:

The calcined shaped alumina may be in the form of spheroids preferably shaped in a forming column, extrudates, tablets or mixtures thereof. The longest dimension of the calcined shaped alumina is at least 0.5 mm (with regards to the spheres the longest dimension is for example the diameter). The calcined shaped alumina is preferably a spheroid, i.e. spheroidal alumina.

The alumina suspension comprises alumina and at least water. The alumina content measured as $Al_2O_3$ in the alumina suspension is preferably between 2 to 20 wt.-%, more preferably 5 to 10 wt.-% of the alumina suspension. The alumina suspension is preferably obtained by the hydrolysis of an alkoxide.

The alumina in the alumina suspension may comprise boehmite, gibbsite, bayerite, transition aluminas (comprising at least gamma-, delta- and theta-alumina) and is most preferably boehmite. Boehmite alumina may be obtained, for example, by the hydrolysis of Al alcoholates in water.

The required crystallite sizes along the (120) and the (020) axis are obtained by hydrothermally ageing the alumina suspension, where at least the hydrothermally aged alumina suspension comprises boehmite. The hydrothermal ageing reaction is typically carried out under stirring at a temperature of between 60 and 300° C., preferably between 80 and 180° C. for a period of between 1 and 30 hours, preferably 15 and 30 hours.

Temperature and time are independently selected. The boehmite, after hydrothermal ageing preferably has a crystallite size along the (120) axis and the (020) axis each of 70 to 110 Å. More preferably, the boehmite after hydrothermal ageing has a ratio of the crystallite size along the (120) axis to the crystallite size along the (020) axis of 0.5:1 to 2.0:1, preferably 0.9:1 to 1.1:1.

The alumina dispersion comprises alumina and at least water. The alumina content measured as $Al_2O_3$ in the alumina dispersion is between 10 and 40 wt.-%, preferably between 25 and 35 wt.-%.

The alumina dispersion preferably includes an acid. The acids that may be used are organic or inorganic acids, preferably nitric acid, acetic acid, formic acid or mixtures thereof. The concentration of the acid in the alumina dispersion may be between 0.1 and 1.5 wt.-%, preferably between 0.9 and 1.2 wt.-%. The particle size of the alumina in the dispersion is preferably below 1 µm, preferably below 500 nm.

Additionally, the alumina dispersion may comprise a hydrocarbon with a boiling point above 250° C., in particular kerosene. The amount of hydrocarbons, particularly kerosene contained in the alumina dispersion may be between above 0 and 10 wt.-% of the alumina dispersion, preferably between above 0 wt.-% and 5 wt.-% of the alumina dispersion. By kerosene is meant a liquid mixture of branched and non-branched paraffins. A typical kerosene according to EINECS 232-384-2 has a specific gravity between 0.81 and 0.89 $g/cm^3$ and a boiling point above 250° C.

Dopants may be added to the alumina paste, or the alumina dispersion, or the hydrothermally aged alumina suspension, or mixtures thereof prior to shaping to form the shaped alumina. Dopants preferably comprise rare-earth elements, transition elements (elements of groups 3-11, preferably elements of groups 4-11, in particular elements of the groups 4 (old IUPAC numbering IVb) and 5 (old IUPAC numbering Vb) of the Periodic System), and Tin and Bismuth. When dopants are added to the alumina dispersion, the alumina dispersion preferably comprises between 0 to 1 wt.-% or above 0 to 1 wt.-%, preferably between 0 wt.-% to 0.5 wt.-% or above 0 to 0.5 wt.-% of the dopants, the weight of the dopant being calculated as the element and the wt.-% relative to the calcined shaped alumina.

Preferably, the alumina dispersion includes organic and inorganic salts of the rare-earth elements and transition elements, in particular elements of the groups 4 (old IUPAC numbering IVb) and 5 (old IUPAC numbering Vb) of the Periodic System of the Elements, more preferably Sn and Bi. Most preferably, the alumina dispersion comprises $SnCl_4$ or $Bi(NO_3)_3 \times 5\, H_2O$. Tin and Bismuth are typically comprised for their catalytic effects.

The alumina paste preferably comprises alumina and an acid. The alumina content in the alumina paste measured as $Al_2O_3$ may be between 20 and 65 wt.-%, preferably between 40 and 60 wt.-%. The acids that may be used are organic or inorganic acids, preferably nitric acid, acetic acid, formic acid or mixtures thereof. The concentration of the acid in the alumina paste may be between 0.1 and 4.0 wt.-%, preferably between 1.0 and 2.5 wt.-%.

Preparing the alumina dispersion from the alumina powder is preferred.

The inventive calcined shaped alumina is obtained by shaping the alumina powder, or the alumina paste, or the alumina dispersion or the hydrothermally aged alumina suspension, or mixtures thereof using various techniques known in the art. For example, to prepare spheroids, the alumina dispersion is dropped in the form of droplets into a forming column. To form extrudates or tablets the alumina powder or alumina paste will be extruded or pressed using techniques known in the art.

The shaped alumina is dried according to one embodiment of the present invention preferably at a temperature of between 90° C. and 150° C., more preferably a temperature of between 110° C. and 130° C., and independent thereof preferably by using a static oven or a belt dryer at residence times between 2 and 24 hours. Such drying techniques are known to a person skilled in the art of the invention.

Calcination occurs according to one embodiment of the present invention at temperatures of between 450° C. and 1100° C., preferably temperatures of between 550° C. and 750° C., and typically in a muffle furnace or a kiln at residence times of between 10 minutes and 10 hours, preferably between 2 and 4 hours. Temperature and time are independently selected.

The invention will now be described with reference to the non-limiting examples and figures in which.

EXAMPLES

Analytical Methods and Definitions

The crystallite sizes of the boehmite according to this invention are determined along the (120) and the (020) axis using the general Scherrer formula:

Crystallite size=$(K \times \lambda \times 57.3)/(\beta \times \cos \theta)$

Whereas:
K (form factor): 0.992
λ (X-ray wave length): 0.154 nm
β (corrected line broadening of apparatus): reflex dependent
θ: reflex dependent The measurements are carried out using a Bruker CubiX$^3$ apparatus. The measurement parameters for the boehmite are 8=14° for the reflex along the (120) axis and 8=7° for the reflex along the (020) axis and 13=0.919 for both reflexes.

The specific surface area as provided herein is measured by BET using nitrogen according to DIN-ISO 9277.

The pore volume (for the pore radius range up to 1000 Å) and the pore radius distribution is measured using mercury intrusion according to DIN 66133. Median pore radius is the radius that corresponds to the 50th percentile of pore volume, i.e. the radius for which one half of the pore volume is found to be in larger pores and one half is found to be in smaller pores.

The diameter of the spheroidal aluminas is determined according to ASTM D1155.

The Crush Strength is determined according to ASTM D6175 for extrudates and according to ASTM D4179 for other shapes.

DSC is determined according to DIN 51007.

As described in ISO 13322-2 (2006) the sphericity is determined by dynamic image analysis with a Camsizer P4 from Retsch. The sphericity (SPHT3) is calculated from the measured perimeter P and area A of the particle projection using following equation $$SPHT3 = \frac{4\pi A}{P^2}$$

The determined value is dimensionless and would be 1 for an ideal sphere and is typically below 1 for spheroidal particles which are non-ideal spheres. In the present case the sphericity is above 0.9.

These procedures were followed exactly as outlined in the prescribed method.

Particle sizes are determined by Laser Diffraction (Malvern Mastersizer 2000) using the Mie theory.

Preparation of the hydrothermally aged samples:

Sample A

The hydrolysis of Al-hexanolate was performed at 98° C. in an aqueous solution of 2% ammonium bicarbonate. The obtained alumina suspension (=boehmite suspension) having 7.5 wt.-% $Al_2O_3$ was stirred at 105° C. for 18 hours at a stirring speed of 3.2 m/s.

The aged alumina suspension was dried in a spray dryer (inlet temperature: 120° C.). A boehmite powder with a crystallite size of 101 Å along the (120) axis and 104 Å along the (020) axis was obtained.

Sample B

The hydrolysis of Al-hexanolate was performed at 98° C. in an aqueous solution of 2% ammonium bicarbonate. The obtained alumina suspension (=boehmite suspension) having 7.5 wt.-% alumina calculated as $Al_2O_3$ was stirred at 100° C. for 16 hours at a stirring speed of 3.2 m/s. The aged alumina suspension was dried in a spray dryer (inlet temperature: 120° C.). A boehmite powder with a crystallite size of 94 Å along the (120) axis and 93 Å along the (020) axis was obtained.

EXPERIMENTS

Example 1=Sample 3a

An alumina dispersion was prepared by dispersing boehmite according to sample A in acidic water. The dispersion contained 32.5 wt.-% boehmite, calculated as $Al_2O_3$, and 0.03 g nitric acid per g of boehmite. After stirring for 10 minutes the sol was fed in the form of drops into a forming column according to U.S. Pat. No. 4,542,113 at a temperature of 20° C. to 25° C. which was filled with an 8 wt.-% solution of ammonia. The green spheroids discharged from the forming column were dried at 120° C. until a constant weight was obtained. The dried spheroids were calcined at 650° C. for 3 hours.

Example 2=Sample 3b

Example 2 was performed as per Example 1 but the dried spheroids were calcined at 950° C. for 3 hours.

Example 3=Sample 4

Example 3 was performed as per Example 1 but the boehmite starting alumina is sample B.

Example 4=Sample 5

Example 4 was performed as per Example 3 but in addition to boehmite, water and acid, the dispersion contained the dopant $SnCl_4 \times 2\ H_2O$ corresponding to 0.4 wt.-% Sn, calculated as $SnO_2$ and on the basis of the calcined alumina spheres.

Example 5=Sample 6

Example 5 was performed as per Example 3 but in addition to boehmite, water and acid, the dispersion contained the dopant $Bi(NO_3)_3 \times 5\ H_2O$ corresponding to 0.1 wt.-% Bi, calculated as $Bi_2O_3$ on the basis of the calcined alumina spheres.

Example 6=Sample 7

Example 6 was performed as per Example 3 but in addition to boehmite, water and acid the dispersion contained 0.1 g kerosene per g of boehmite.

Example 7=Sample 8 (Extrudates)

An alumina paste was prepared by mixing 1500 g of sample B with 1250 g 4 wt.-% acetic acid in a high shear mixer for 15 minutes. This paste was pressed through a hole disk obtaining extrudates with a diameter of 1.69 mm. The green bodies were dried at 120° C. until constant weight. The dried extrudates were calcined at 650° C. for 3 hours.

Example 8=Sample 9 (Tablets)

The tablets (5.1×5.2 mm) were pressed by processes known in the art using the boehmite powder of sample B and calcined at 650° C. for 3 hours.

Comparative Example 1=Sample 1 (without Kerosene)

An alumina dispersion was prepared by mixing a boehmite powder having a crystallite size of 38 Å along the (120) axis and 30 Å along the (020) axis, which has been prepared without an ageing step, in acidic water. The dispersion contained 32.5 wt.-% solid and 0.03 g nitric acid per g of boehmite. After stirring for 10 minutes the sol was fed in the form of drops into a forming column at a temperature of 20° C. to 25° C. which was filled with an 8 wt.-% solution of ammonia. The green spheroids discharged from the forming column were dried at 120° C. until constant weight. The dried spheroids were calcined at 650° C. for 3 hours.

Comparative Example 2=Sample 2 (with Kerosene)

Comparative Example 2 was performed as per Comparative Example 1 but in addition to boehmite, water and acid the dispersion contained 0.1 g kerosene per g of boehmite.

A summary of the Examples and Comparative Examples 1 and 2, including the results, are included in Table 1 hereunder.

Figure 1:
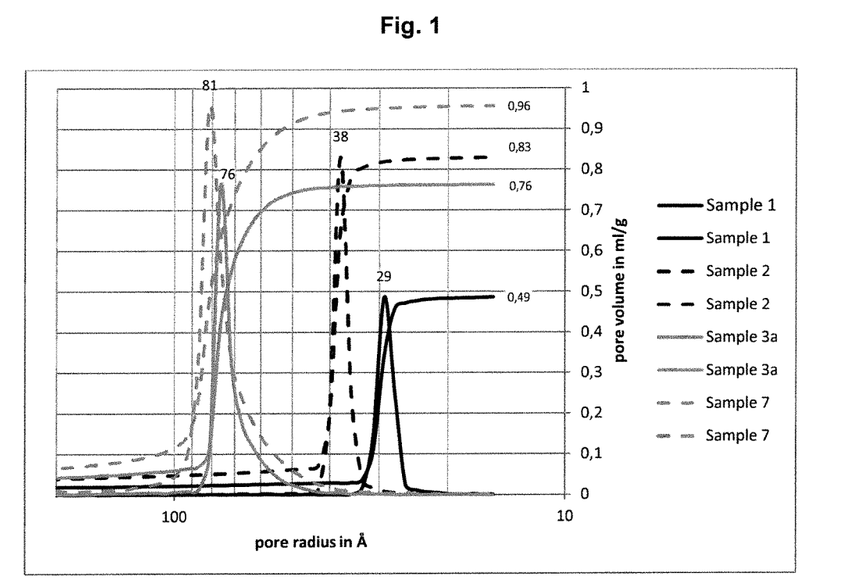
FIG. 1 shows the pore radius distribution of Comparative Examples 1 and 2 (sample 1 and 2) and Examples 1 and 6 (samples 3a and 7)
Figure 2:
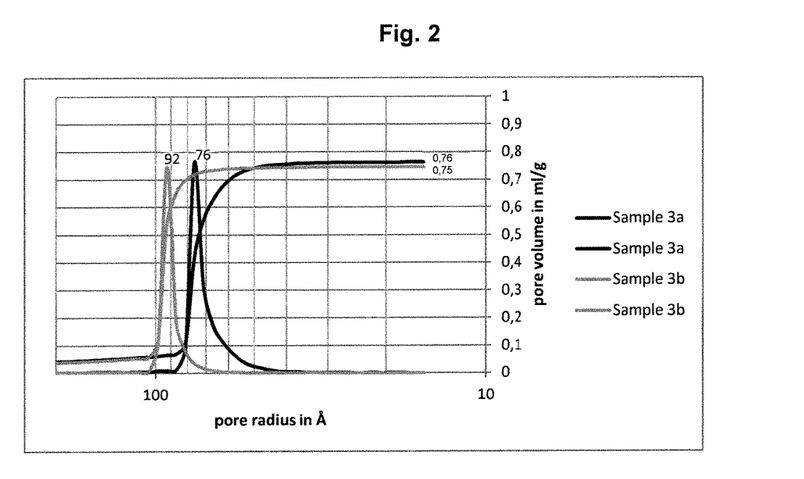
FIG. 2 shows the pore radius Distribution of Examples 1 and 2 calcined at different temperatures.
Figure 3:
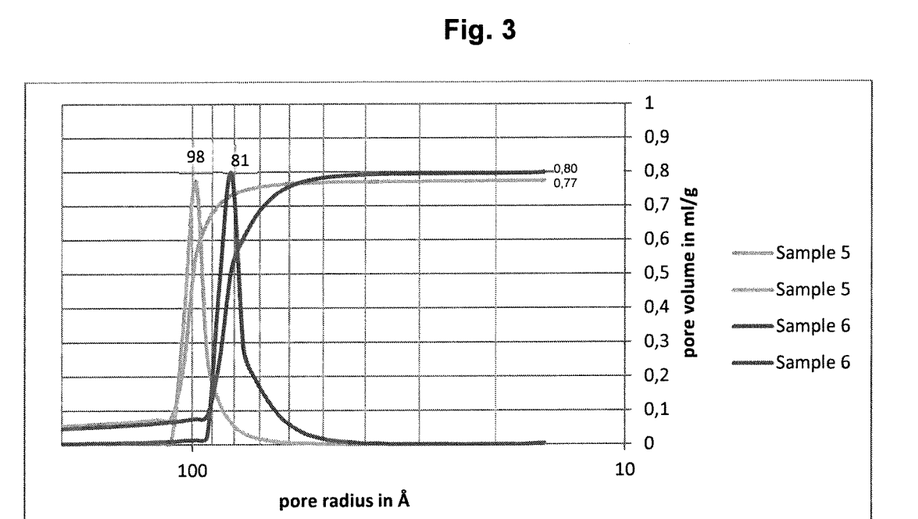
FIG. 3 shows the pore radius distribution for Examples 4 and 5 (samples 5 and 6) comprising different dopants.
Figure 4:
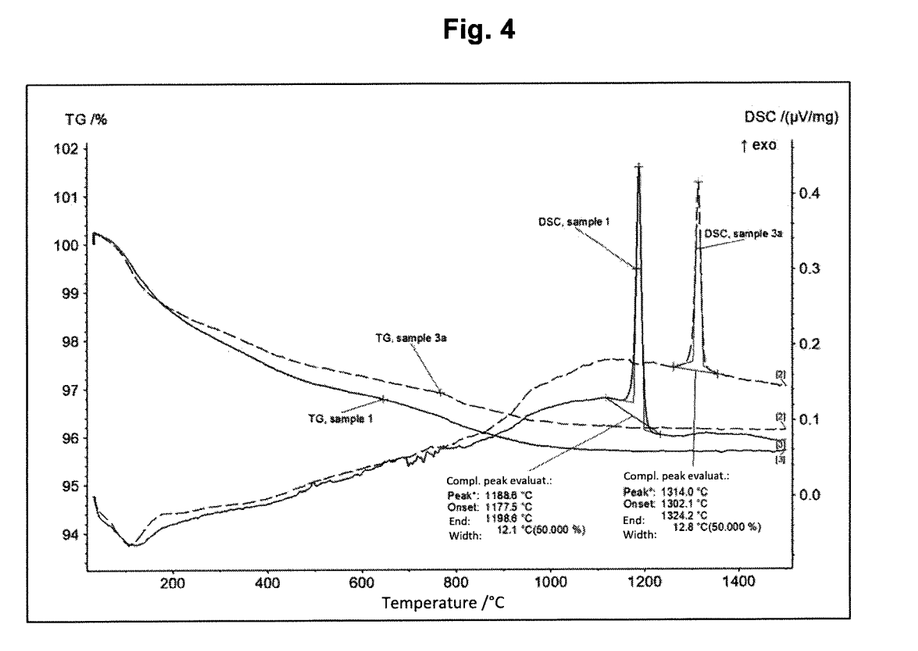
FIG. 4 shows a DSC (Differential Scanning calorimetry)-TG (Thermal Gravimetric) Analysis of Comparative Example 1 and Example 1.
Figure 5:
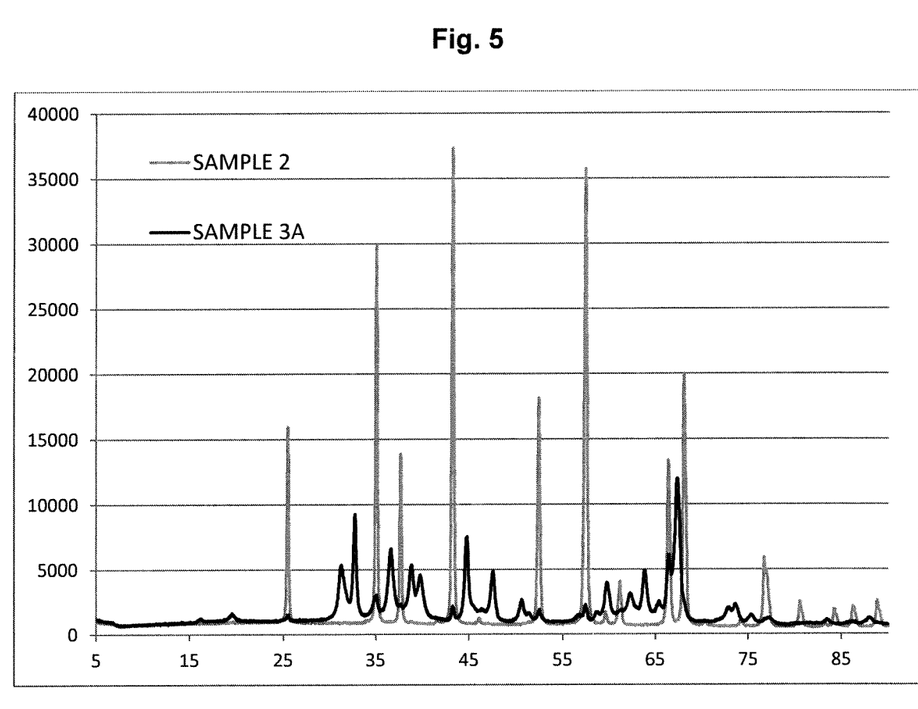
FIG. 5 is an X-Ray Diffraction of Comparative Example 2 and Example 1 after both were calcined at 1200° C. for 3 hours.

FIG. 1 compares the pore radius distribution of Comparative Example 1 (Sample 1), Comparative Example 2 (Sample 2) and Example 1 (Sample 3a), Example 6 (Sample 7). As per FIG. 1 it is clear that the median pore radius of the Comparative Example 1 is below that of the inventive examples. FIG. 2 shows the pore radius distribution of Example 1 and 2 having the same starting material but being calcined at different temperatures. FIG. 3 shows the pore radius distribution of Example 4 and 5 (Sample 5 and 6) having different dopants. FIG. 4 is a DSC (Differential Scanning calorimetry)-curve that shows the phase transitions of alumina as per Comparative Example 1 (Sample 1) and Example 1 (Sample 3a). As shown Com-ic) parative Example 1 (Sample 1) is characterized by a phase transition into the alpha-phase at 1188.6° C. whilst Example 1 (Sample 3a) prepared acc. to the invention, shows a phase transition into the alpha-phase at 1314° C. The phase transition into the alpha-phase is attended with a reduction of the surface area. FIG. 5 shows the comparison between Comparative Example 2 (Sample 2) and again Example 1 (Sample 3a) after both were calcined at 1200° C. for 3 hours. Comparative Example 2 shows the alpha phase whilst Example 2 shows only the theta phase.

TABLE 1

| Characteristic ** (unit) | Comp Ex. 1 | Comp Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Alumina Crystallite size (020) (nm) | <30 | <30 | 104 | 104 | 93 | 93 | 93 | 93 | 93 | 93 |
| Alumina Crystallite size (021) (nm) | 38 | 38 | 101 | 101 | 94 | 94 | 94 | 94 | 94 | 94 |
| Ratio (020)/(021) of starting alumina | <0.79 | <0.79 | 1.03 | 1.03 | 0.99 | 0, .99 | 0.99 | 0.99 | 0.99 | 0.99 |
| BET Surface Area* ($m^2/g$) of starting alumina | 282 | 282 | 195 | 195 | 193 | 193 | 193 | 193 | 193 | 193 |
| Total pore volume of starting alumina ($cm^3/g$) | 0.47 | 0.47 | 0.86 | 0.86 | 0.82 | 0.82 | 0.82 | 0.82 | 0.82 | 0.82 |

TABLE 1-continued

| Characteristic ** (unit) | Comp Ex. 1 | Comp Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Shape | spheroid | spheroid | spheroid | spheroid | Spheroid | spheroid | spheroid | spheroid | extrudate | Tablet |
| Size (mm) (largest dimension) | 2.57 | 1.88 | 1.82 | 1.79 | 1.83 | 1.76 | 1.87 | 1.67 | 1.69 | 5.1 × 5.2 |
| Crush Strength (N) | 185 | 76 | 57 | 50 | 43 | 36 | 40 | 32 | 57 | 63 |
| Surface Area (m²/g) | 215 | 188 | 154 | 111 | 149 | 108 | 139 | 171 | 172 | 162 |
| Surface Area - 1200° C. (m²/g) | 7 | 7 | 44 | 63 | 57 | 71 | 27 | 52 | 11 | 13 |
| Total Pore Volume (Hg-1000 Å) (cm³/g) | 0.49 | 0.83 | 0.76 | 0.75 | 0.80 | 0.77 | 0.80 | 0.96 | 0.78 | 0.76 |
| Median Pore Radius (nm) | 2.9 | 3.9 | 7.7 | 9.2 | 8.1 | 9.8 | 8.2 | 8.1 | 7.5 | 8.6 |
| Alpha transition temperature (° C.) | 1188 | 1220 | 1314 | 1314 | 1314 | 1345 | 1314 | 1318 | 1272 | 1290 |

*BET Surface area and Total Pore Volume at 550° C. and Hg, 550° C. respectively
** content of Na, Si and Fe is each below 50 ppm for all Comparative Example 3 (Example 5 of U.S. Pat. No. 4,542,113)

Comparative Example 3 was performed by reworking Example 5 of U.S. Pat. No. 4,542,113. The exact same experimental procedure was used. The raw material was a mixture of two boehmites with the following properties:

TABLE 2

| Boehmite | (020) | (120) |
|---|---|---|
| 30 wt. % | 65 Å | 96 Å |
| 70 wt. % | 40 Å | 54 Å |

Comparing the properties of the resulting material to the properties reported in example 5 of U.S. Pat. No. 4,542,113, the conclusion is that the reworking is representative (see Table 3).

TABLE 3

| | Data mentioned for Example 5 of U.S. Pat. No. 4,542,113 | Comparative Example 3 |
|---|---|---|
| Diameter (mm) | 2-3 | 1.6 |
| Crush strength (N/spheroid) | 40 | 41 |
| Pore volume (ml/g) | 0.68 | 0.85 |
| Specific surface area (m²/g) | 242 | 260 |

Figure 6:
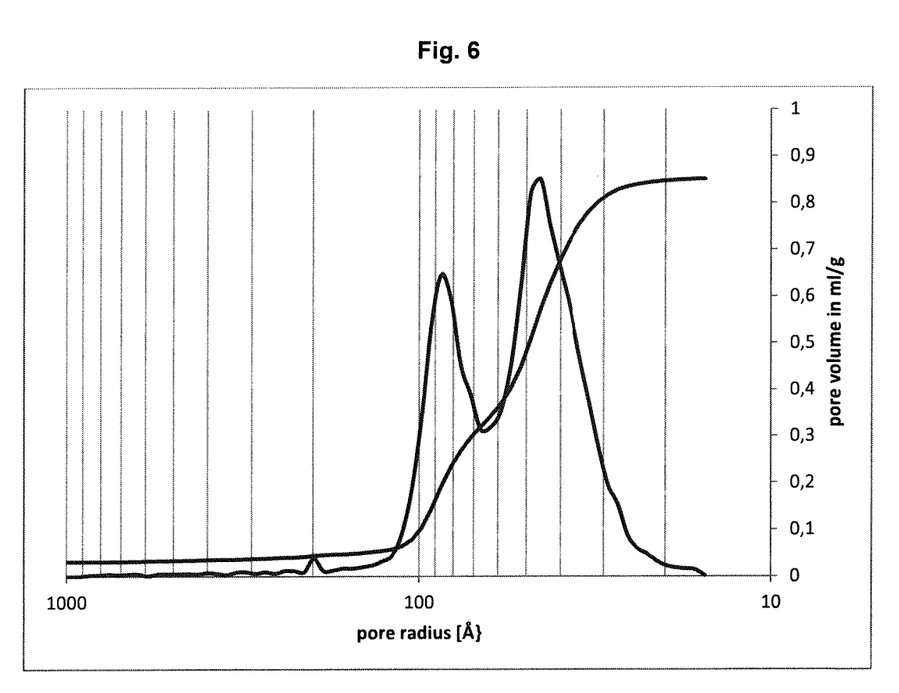
FIG. 6 shows the pore radius distribution of Comparative Example 3.

FIG. 6 shows the pore radius distribution of Comparative Example 3. The measured median pore size is 4.9 nm, and the pore radius distribution is bimodal.

The invention claimed is:

1. A calcined shaped alumina comprising the following features a) to c):
   a) a crush strength between 30 and 70 N;
   b) a monodispersed pore radius distribution with a median pore radius between 5 and 12 nm, and
   c) an alpha transition temperature about 1200° C.,
   wherein the calcined shaped alumina is in the form of spheroids having a sphericity of above 0.9, extrudates, tablets or mixtures thereof, and wherein a content of Si impurities of the calcined shaped alumina is below 100 ppm.

2. The calcined shaped alumina of claim 1 further comprising one or more of the features d) to f):
   d) a total pore volume between 0.4 and 1.2 cm³/g;
   e) a BET surface area between 10 and 100 m²/g after calcination at 1200° C. for 3 hours;
   f) a content of Na and Fe impurities of the calcined shaped alumina is each below 100 ppm.

3. The calcined shaped alumina of claim 2 comprising feature d).

4. The calcined shaped alumina of claim 1, wherein the calcined shaped alumina is in the form of spheroids having a sphericity of above 0.9.

5. The calcined shaped alumina of claim 1, wherein the calcined shaped alumina is in the form of a spheroid and the spheroid comprises a diameter of between 0.5 mm and 3.0 mm.

6. The calcined shaped alumina of claim 1 comprising one or more dopants.

7. A method to prepare the calcined shaped alumina of claim 1, the method comprising the following steps:
   i) preparing an alumina suspension, the alumina suspension comprising alumina and at least water;
   ii) hydrothermally ageing the alumina suspension until the alumina in the alumina suspension has a crystallite size along the (120) axis and the (020) axis each of 70 to 110 Å to form a hydrothermally aged alumina suspension,
   iii) optionally drying the hydrothermally aged alumina suspension to obtain an alumina powder;
   iv) optionally preparing either an alumina paste from the alumina powder or an alumina dispersion from either the alumina powder or the hydrothermally aged alumina suspension;
   v) shaping the alumina powder, or the alumina paste or the alumina dispersion or the hydrothermally aged alumina suspension or mixtures thereof to form a shaped alumina;
   vi) drying the shaped alumina to form a dried shaped alumina; and
   vii) calcining the dried shaped alumina to form a calcined shaped alumina, wherein the calcined shaped alumina is in the form of spheroids having a sphericity of above 0.9, extrudates, tablets or mixtures thereof.

8. The method of claim 7, wherein the calcined shaped alumina is in the form of spheroids having a sphericity of above 0.9.

9. The method of claim 7, wherein the alumina content of the alumina suspension calculated as $Al_2O_3$ is between 2 and 20 wt.-% of the alumina suspension.

10. The method of claim 7, wherein the alumina content of the alumina dispersion calculated as $Al_2O_3$ is between 10 and 40 wt.-%.

11. The method of claim 7, wherein the alumina dispersion comprises an acid.

12. The method of claim 7, wherein the alumina dispersion comprises kerosene.

13. The method of claim 7, wherein one or more dopants are added to the alumina paste, or the alumina dispersion, or the hydrothermally aged alumina suspension, or mixtures thereof prior to shaping to form the shaped alumina.

14. The method of claim 7, wherein the alumina in the alumina suspension is boehmite, gibbsite, bayerite and at least one transition alumina.

15. The method of claim 7, wherein the alumina in the alumina suspension after hydrothermal aging comprises boehmite or consists of boehmite.

16. The method of claim 7, wherein the boehmite after hydrothermal ageing has a ratio of the crystallite size along the (120) axis to the crystallite size along the (020) axis of 0.5:1 to 2.0:1.

17. The method of claim 7, wherein the hydrothermal ageing reaction is carried out at a temperature of between 60° C. and 300° C.

18. The method of claim 7, wherein the shaped alumina is dried at a temperature of between 90° C. and 150° C. for 2 to 24 hours.

19. The method of claim 7, wherein calcination occurs at temperatures of between 450° C. and 1100° C.

* * * * *